United States Patent

Bergmans et al.

[11] Patent Number: 6,011,817
[45] Date of Patent: Jan. 4, 2000

[54] TRANSMISSION SYSTEM AND RECEIVER WITH IMPROVED DETECTION, AND IMPROVED DETECTION METHOD

[75] Inventors: Johannes W. M. Bergmans; Johnnes O. Voorman, both of Eindhoven, Netherlands

[73] Assignee: U.S. Philips Corporation, New York, N.Y.

[21] Appl. No.: 08/886,997

[22] Filed: Jul. 2, 1997

[30] Foreign Application Priority Data

Jul. 4, 1996 [EP] European Pat. Off. .............. 96201849

[51] Int. Cl.[7] ..................................................... H03D 1/00
[52] U.S. Cl. ........................................... 375/340; 375/287
[58] Field of Search ..................................... 375/260, 267, 375/340, 347, 224, 233, 235, 246, 248, 249, 317

[56] References Cited

U.S. PATENT DOCUMENTS

| | | | |
|---|---|---|---|
| 5,134,632 | 7/1992 | Fletcher et al. | 375/238 |
| 5,203,027 | 4/1993 | Nounin et al. | 455/134 |
| 5,375,143 | 12/1994 | Kazecki et al. | 375/233 |
| 5,412,692 | 5/1995 | Uchida | 375/317 |
| 5,463,654 | 10/1995 | Bergmans | 375/341 |
| 5,541,963 | 7/1996 | Nakagoshi | 375/347 |
| 5,572,503 | 11/1996 | Satoh et al. | 369/124 |
| 5,586,148 | 12/1996 | Furukawa et al. | 375/340 |
| 5,781,592 | 7/1998 | Masuda | 375/347 |

OTHER PUBLICATIONS

"Performance Improvement in Decision Feedback Equalisers by Using Soft Decision", by E. Dahlman and B. Gudmundson in Electronic Letters, vol. 24, No. 17, Aug. 18, 1988 pp. 1084–1085.

*Primary Examiner*—Stephen Chin
*Assistant Examiner*—Lenny Jiang

[57] ABSTRACT

In a transmission system digital symbols are transmitted by a transmitter via a channel to a receiver. The receiver comprises a first detector and a second detector with different decision levels. In the case of an unreliable input signal of the detectors, the sequences of detected symbols at the outputs of the detectors may differ. By checking the sequences of digital symbols on code rule violations, the most likely sequence of detected symbols can be selected by a selector and passed to the output.

14 Claims, 2 Drawing Sheets

TRANSMISSION SYSTEM AND RECEIVER WITH IMPROVED DETECTION, AND IMPROVED DETECTION METHOD

BACKGROUND OF THE INVENTION

1. Field of the Invention

The present invention is related to a transmission system comprising a transmitter for transmitting a sequence of digital symbols to a receiver, said receiver comprising means for deriving at least a first detection signal and a second detection signal from the received signal, at least a first detector for deriving a first sequence of detected symbols from the first detection signal and a second detector for deriving a second sequence of detected symbols from the second detection signal, and means for determining an output sequence of digital symbols from at least the first and second sequence of detected symbols.

The present invention is also related to a receiver and to a receiving method.

2. Discussion of the Related Art

A transmission system according to the preamble is known from the article "performance improvement in decision feedback equalisers by using soft decision" by E. Dahlman and B. Gudmundson in Electronics Letters, Vol. 24, No. 17, Aug. 18, 1998.

Transmission systems of this type may be used, for example, for digital symbol transfer through the public telephone network or for reconstructing digital symbols received from a magnetic tape or disc.

When digital symbols are transmitted from a transmitter to a receiver or stored on a recording medium respectively, the symbols to be transmitted or recorded are converted to a signal representing the digital symbols. This generally happens in the form of analog pulses which are successively applied to the transmission medium or recording medium respectively, further to be referenced by the term channel. At the input of the receiver, analog pulses are present. The receiver comprises means for deriving a detection signal from the input signal. This means can comprise an equalizing filter, it can comprise a subtracter for subtracting postcursive intersymbol interference derived from previously detected symbols, or it can simply comprise an interconnection. The detector is arranged for deriving a sequence of detected symbols from the detection signal. The detector may comprise a simple comparator for comparing the detection signal with one or more reference levels.

In addition to the (desired) analog pulses, there is nearly always an undesired noise signal present in the output of the channel. Due to the presence of this noise signal, the detector will occasionally make erroneous decisions with respect to the value of the transmitted symbols. In order to reduce the adverse influence of said erroneous decisions the receiver in the transmission system according to the above mentioned article comprises so-called erasure detection means for determining whether the analog pulse has an amplitude in the vicinity of a reference level. If this is the case, a decision based on this pulse has a reduced reliability. To deal with this reduced reliability, the above mentioned receiver comprises two detectors. In the transmission system according to the above mentioned article, binary signaling is used. In the case of an unreliable decision, the decision of one detector, is reversed. The result is that, at the output of one of the detectors a correct sequence of digital symbols is present. In the means for determining an output sequence of digital symbols it is checked which sequence has the largest likelihood to be correct. This sequence is subsequently selected as the output sequence.

In the above mentioned transmission system, the maximum attainable data rate is limited, due to the time required for detection of an erasure and the introduction of an additional switching delay needed to invert the output signal of the second detector in case of an erasure.

SUMMARY OF THE INVENTION

It is an object of the present invention to provide a transmission system according to the preamble which can attain higher data rates.

Therefore the transmission system according to the preamble is characterized in that the first detector and the second detector use different reference levels for deriving the first sequence of detected symbols from the first detection signal and the second sequence of detected symbols from the second detection signal.

By using detectors having different reference levels, the sequence of detected symbols from the detectors, will be different if the detection signal assumes a value between these reference levels. This situation corresponds to the presence of an erasure in the prior art transmission system. Consequently no additional measures like inverting etc. are required to deal with such erasures, resulting in an increased maximum data rate. The determination of the likelihood of a sequence to be correct can be done in different ways.

Often a channel code is used in which the sequence of detected symbols have to comply with certain code rules. A sequence of detected symbols which violates the code rules is certainly wrong. If one of the sequences of detected symbols includes such a code rule violation, the other sequence of digital symbols is selected.

In the known transmission system according to the above mentioned article, a decision feedback equaliser is used. This creates the opportunity to obtain a reliability measure by calculating an error measure through subtraction of the input signal from the output signal of the detector. If a wrong decision is made, this will lead to a large difference between the input signal and the output signal of the detector, because in case of a wrong decision the intersymbol interference introduced by the transmission channel will no longer be cancelled by the output signal of the feedback filter in instants that immediately follow the erroneous decision. The (squared) error signal is normally integrated over some period of time.

An embodiment of the invention is characterized in that the receiver comprises means for temporarily making the reference levels of the first detector and the second detector equal after an instant on which a symbol value in the first sequence of detected symbols differs from a corresponding symbol value in the second sequence of detected symbols.

Simulations have shown that by temporarily making the reference levels equal after the detection of differing symbols in the sequences of detected symbols, the performance of the transmission system is improved due to the optimal value of the reference levels.

A further embodiment of the invention is characterized in that the receiver comprises a first feedback filter for deriving a first feedback signal from the first sequence of digital symbols, and a second feedback filter for deriving a second feedback signal from the second sequence of digital symbols, and in that the means for deriving a first detection signal and a second detection signal comprise a first combining means for combining a signal representative of the input signal and the first feedback signal into the first detection signal, and second combining means for combining a signal representative of the input signal and the second feedback signal into the second detection signal.

By using a first feedback filter in combination with the first detector, and a second feedback filter in combination with the second detector, it is possible to apply the present invention also for channels causing intersymbol interference in the input signal. By use of the feedback filters, the detection signal corresponding to the correct sequence of detected symbols will be substantially free from intersymbol interference.

A still further embodiment of the present invention is characterized in that the means for determining an output sequence of digital symbols from the at least first and second sequence of detected symbols are arranged for selecting the most likely sequence of detected symbols from the at least first and second sequence of detected symbols, and in that the receiver comprises means for transferring the state of the first feedback filter to the second feedback filter if the first sequence of detected symbols is selected, and for transferring the state of the second feedback filter to the first feedback filter if the second sequence of detected symbols is selected By transferring the state of the feedback filter corresponding to the correct sequence of detected symbols to another feedback filter, it is prevented that the wrong state of the feedback filter corresponding to the wrong sequence of detected symbols causes the introduction of additional errors.

BRIEF DESCRIPTION OF THE DRAWINGS

The invention will now be explained referring to the drawings. Herein shows.

DESCRIPTION OF THE PREFERRED EMBODIMENTS

Figure 1:
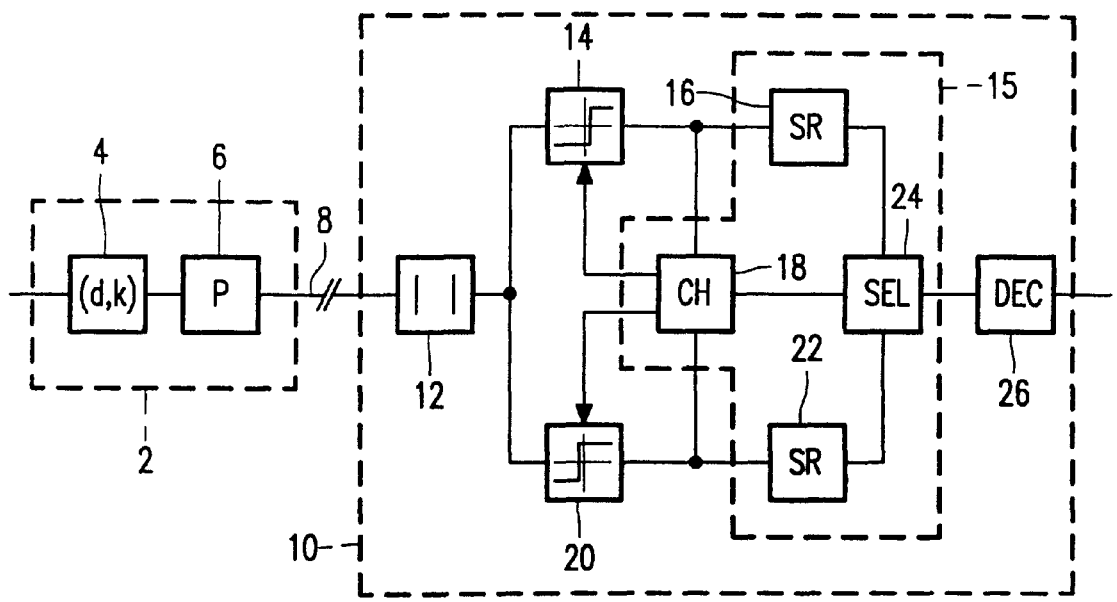
FIG. 1, a first embodiment of the transmission system according to the invention using binary symbols.

In the transmission system according to FIG. 1, the source symbols to be transmitted are applied to an (d,k) encoder 4 in a transmitter 2. The output of the (d,k) encoder 4 is connected to an input of a so-called first order precoder 6. The output of the precoder 6 is connected to the channel 8.

The output of the channel 8 is connected to an input of a receiver 10. In the receiver the output signal of the channel is applied to the means for determining the first and the second detection signal, being here an absolute value estimator 12. The output of the absolute value estimator 12 is connected to an input of a first detector 14, and an input of a second detector 20. The output of the first detector 14 is connected to an input of a shift register 16 and to a first input of a check arrangement 18. The output of the second detector 20 is connected to an input of a shift register 22 and to a second input of a check arrangement 18. A first output of the check arrangement 18 is connected to a control input of the first detector 14, a second output of the check arrangement 18 is connected to a control input of the second detector 20.

An output of the shift register 16 is connected to a first input of the selection device 24, and an output of the shift register 22 is connected to a second input of the selection device 24. The output of the selection device 24 is connected to a decoder 26.

A third output of the check arrangement 18 is connected to a first input of a selection device 24. The output of the selection device 24 is connected to an input of a decoder 26. The means 15 for determining an output sequence of digital symbols from the first and second sequence of detected symbols are constituted by the check arrangement 18, the shift registers 16 and 22 and the selector 24. At the output of the decoder 26, the reconstructed digital symbols are available.

In the transmission system according to FIG. 1 the source symbols to be transmitted (or recorded) are applied to the (d,k) encoder 4 in the transmitter 2. The (d,k) encoder 4 encodes the source symbols according to a so-called (d,k) sequence. This means that in the sequence of encoded symbols, two symbols having a logical value "1" are separated by at least d symbols with logical value "0", and that the length of any run of consecutive symbols with value "0" is at most equal to k. Suitable value for d and k are e.g. 1 and 7. The reason for the "d" constraint is the limitation of the number of transitions, and therewith the amount of intersymbol interference present in the signal received from the channel. Said intersymbol interference is caused by the finite duration of the impulse response of the channel. It also reduces the influences of non-linearity of the channel on the received signal. The reason for the "k" constraint is to ensure a minimum amount of transitions in the sequence of coded symbols, facilitating easy clock recovery in the receiver.

In the precoder 6, the encoded source symbols are converted into channel symbols. In the present precoder 6, a coded source symbol having a logical value of "1" causes the channel symbol to change its value, and a coded source symbol having a logical value of "0" causes the channel symbol to maintain its actual value. The reason for this kind of precoding is that the system becomes invulnerable for polarity inversions on the path from transmitter to receiver.

A well known example of a channel is the magnetic recording channel in which a differentiating head is used. At low recording densities, the continuous-time transfer function of such a channel may be approximated by a time discrete transfer function 1-D, in which D represents a unit delay. By coding symbols having a logical value of "1" as a transition (from +1 to −1 or from −1 to +1), the symbols with logical value "1" correspond at the output of the channel to pulses having a value of +2 or −2. Symbols with a logical value of "0" correspond at the output of the channel to a value of 0.

In the receiver 10, the signal received from the channel 8 is rectified by the absolute value estimator 12. At the output of the absolute value estimator 12 a signal is present, comprising positive pulses with value +2 corresponding to coded source symbols having a logical value of "1". The symbols with a logical value of "0" are indicated by the absence of pulses (value of 0). The first detector 14 and the second detector 20 derive a sequence of digital symbols from the pulses at their inputs. In most cases the sequences of digital symbols are equal and the selection device 18 will remain in its present state. One of the sequences of digital symbols is passed via the corresponding shift register 16 or 22 to the output of the selection device 24.

According to the inventive idea of the present invention, the first detector 14 and the second detector 20 use different reference levels. Suitable reference levels are 1+α and 1−α with α having a value between approximately 0.2 and 0.3. Due to the different reference levels, it can occur that the first and second sequences of digital symbols differ. This will occur when the signal at the input of the detectors has a value between the reference levels, indicating that the decision made by the detectors 14 and 20 is unreliable. After a difference has occurred between the sequences of detected symbols, both sequences of detected symbols are checked against the restrictions imposed on them according to the RLL (1,7) coding scheme. The sequence of detected symbols which violates the RLL (1,7) restrictions is certainly wrong and consequently the selection device 24 is instructed by the check arrangement 18 to select the other sequence of detected symbols. If a sufficient delay has been chosen for the shift registers 16 and 17, the switch over has been performed before the wrong symbol value arrives at the output of the corresponding shift register. This results in that always the correct sequence of digital symbols is available at the output of the selection device 24. It is observed that the performance of the detection can be improved by making the reference levels of the first detector 14 and the 20 temporarily equal to the optimum reference level. This measure results in an increased reliability of the symbols detected after the occurrence of the unreliable decision. The period in which the reference levels are made equal to the optimum reference level is approximately equal to the time required after the detection of an error for determining the wrong symbol and correcting it.

Figure 2:
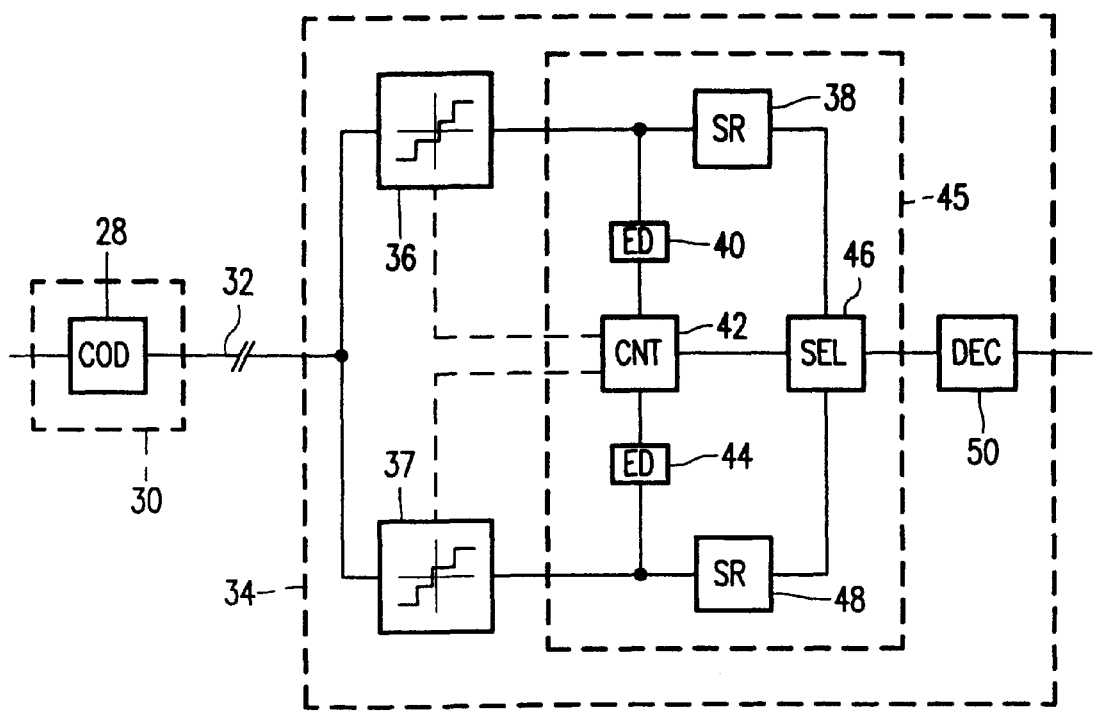
FIG. 2, a transmission system according to the invention for use with multilevel data.

In the transmission system according to FIG. 2 a sequence of source symbols is applied to a transmitter 30. In the transmitter 30 said sequence of source symbols is applied to an encoder 28, which encodes the source symbols into a sequence of digital symbols to be transmitted. The sequence of source symbols can e.g. be a sequence of 7-bit ASCII code words, and the sequence of symbols to be transmitted can be a sequence of 7 bit ASCII characters having one parity bit added. This results in 8 bit codewords.

The output of the transmitter 30 is connected via a transmission channel 32 to a receiver 34. In the receiver 34 the output of the transmission medium 32 is connected to an input of the first detector 36 and to an input of the second detector 37. The means for deriving the first and second detection signal is constituted by the interconnection between the input of the receiver 34 and the first and the second detector 36 and 37.

The output of the first detector 36 is connected to an input of a shift register 38, and to an input of an error detector 40. The output of the error detector 40 is connected to a first input of a control circuit 42. The output of the second detector 37 is connected to an input of a shift register 48, and to an input of an error detector 44. The output of the error detector 44 is connected to a second input of a control circuit 42. An output of the shift register 38 is connected to a first input of a selector 46, and an output of the shift register 48 is connected to a second input of the selector 46. An output of the control circuit 42 is connected to a control input of the selector 46. An output of the selector 46 is connected to an input of a decoder 50. The means 45 for determining an output sequence of digital symbols from the first and second sequence of detected symbols are constituted by the control circuit 42, the error detectors 40 and 44, the shift registers 38 and 48 and the selector 46. At the output of the decoder 50, the decoded output symbols are available.

In the transmission system according to FIG. 2 the transmitter 30 is arranged for transmitting data symbols having four possible levels, e.g. −3, −1, +1 and +3. The source symbols are encoded using an error detecting code such as a parity code or a Hamming code. Subsequently the sequence of digital symbols to be transmitted is obtained by combining pairs of bits into four level symbols. These four level symbols are received by the receiver 34. The detection signal for the first and second detector 36 and 37 is constituted by the signal received from the transmission medium 32. If the received signal value corresponding to the different digital symbols is equal to −3, −1, +1 and +3, suitable reference levels for the first detector 36 are −2+α, α, and 2+α, and suitable reference levels for the second detector 37 are −2−α, −α, and 2−α. α can have a value between 0.2−0.3.

In most cases the sequences of detected symbols at the output of both detectors will be equal. In such cases the sequences of detected symbols from one of the detectors will be applied to the decoder 50 for final decoding. In the case that the sequences of detected symbols differ, the decisions are unreliable. This will be the case if the detection signal assumes a value between a reference level in the first detector 36 and the corresponding reference level in the second detector 37.

In such a case one of the code words in one of the sequences of detected symbols is incorrect, and the codewords in the other sequence of digital symbols is very likely correct. By means of the error detectors 40 and 44 errors in the code words are detected. The control circuit 42 generates a control signal for the selector 46 for selecting the sequence of detected symbols in which no codewords with errors were detected by one of the error detectors 40 and 44. Again it is possible to make the reference levels of both detectors temporarily (during 8 symbol periods) equal as soon as a difference between the sequences of detected symbols occurs. The shift registers 38 and 48 are present to delay both sequences of digital symbols to deal with the delay required for taking the decision about the correct sequence of detected symbols. Finally the digital symbols at the output of the selector 46 are decoded by the decoder 50.

Figure 3:
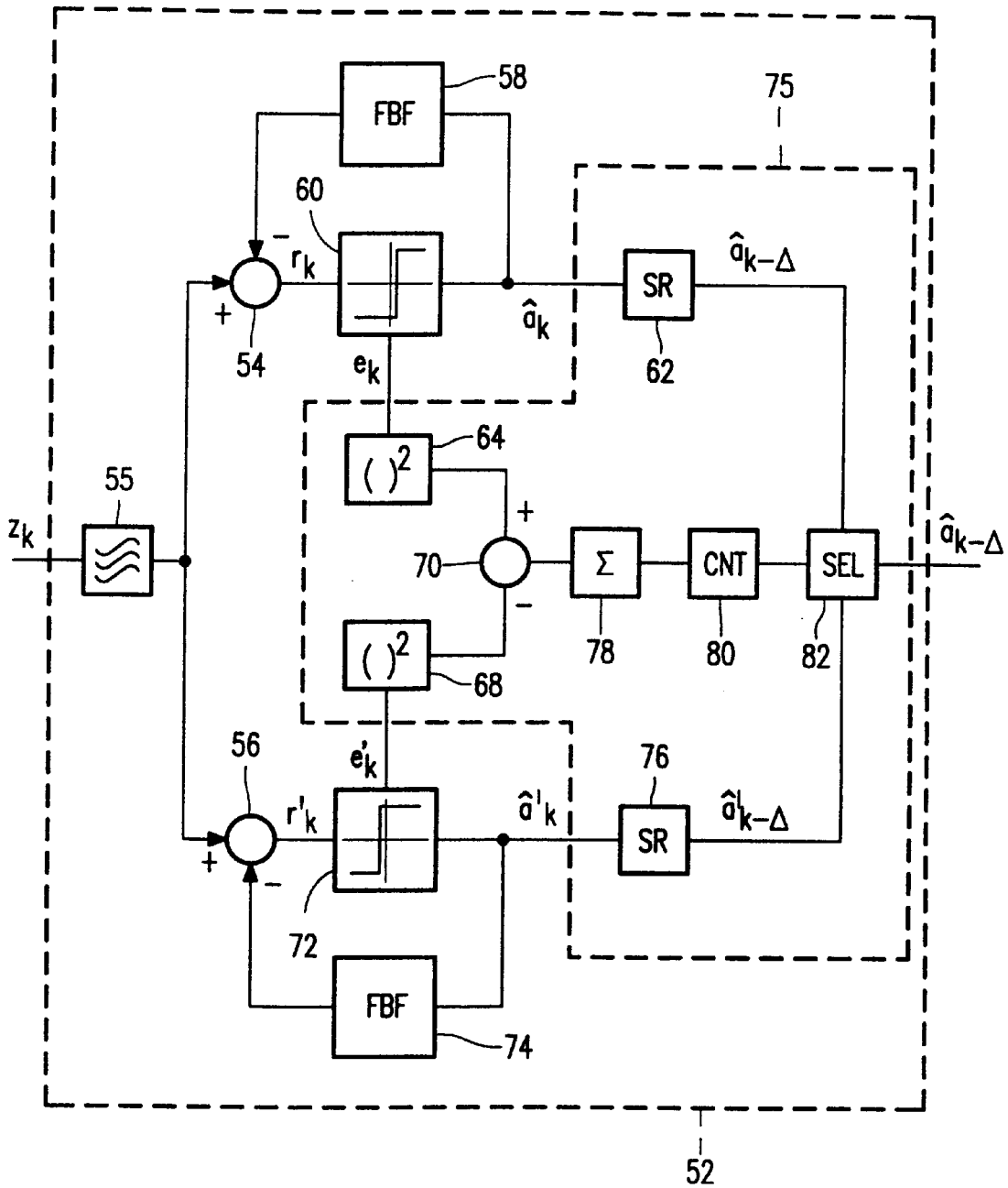
FIG. 3, a transmission system according to the invention in which decision feedback equalization is used.

In the receiver 52 according to FIG. 3, the received signal $z_k$ is applied to an input of an equalizing filter 55. The output of the equalizing filter 55 is connected to an input of a subtracter 54 and to an input of a subtracter 56. The equalizing filter 55 and the subtracters 54 and 56 constitute the means for deriving the first and the second detection signal from the received signal. The output of the first subtracter 54 with output signal $r_k$ is connected to an input of the first detector 60. A first output of the first detector 60 with output signal $\hat{a}_k$ is connected to an input of a shift register 62 and to an input of a feed back filter 58. The output of the feed back filter 58 is connected to a second input of the subtracter 54. An output of the shift register 62 with output signal $\hat{a}_{k-\Delta}$ is connected to a first input of a selector 82. The output of the second subtracter 56 with output signal $r'_k$ is connected to an input of the second detector 72. A first output of the second detector 72 with output signal $\hat{a}'_k$ is connected to an input of a shift register 76 and to an input of a feed back filter 74. The output of the feed back filter 74 is connected to a second input of the subtracter 56. An output of the shift register 76 with output signal $\hat{a}'_{k-\Delta}$ is connected to a second input of a selector 82.

A second output of the detector 60, carrying an error signal $e_k$, is connected to an input of a squarer 64. The output of the squarer 64 is connected to a first input of a subtracter 70. A second output of the detector 72, carrying an error signal $e'_k$, is connected to an input of a squarer 68. The output of the squarer 68 is connected to a second input of the subtracter 70. An output of the subtracter 70 is connected to an input of an accumulator 78. An output of the accumulator 78 is connected to an input of a control device 80. An output of the control device 80 is connected to a control input of the selector 82. The means 75 for determining an output sequence of digital symbols from the first and second sequence of detected symbols are constituted by the squarers 64 and 68, the subtracter 70, the accumulator 78, the control device 80, the shift registers 62 and 76 and the selector 82. At the output of the selector 82 the final sequence of digital symbols is available.

The receiver according to FIG. 3 is arranged for use with a channel causing a substantial amount of intersymbol interference in the received signal. The object of the filter 55 is to suppress precursive intersymbol interference and out-of-band noise. The first detection signal $r_k$ is obtained by subtracting an estimate of the postcursive intersymbol interference from the output signal of the filter 55. The estimate of the postcursive intersymbol interference is obtained by filtering the previously detected symbols by the first feedback filter 58. In the same way the second detection signal $r'_k$ is obtained by subtracting the output signal of the feedback filter 74 from the output signal of the filter 55. If the equalized system being constituted by the cascade connection of the channel and the filter 50 has a so-called causal and monic impulse response $q_k$ ($q_k=0$ for k<0 and k>0 and $q_0=1$), the feedback filters should have the impulse response $p_k$ which is equal to 0 for k smaller than 1, and which is equal to $q_k$ for $k \geq 1$.

The first detector 60 and the second detector 72 derive each a sequence of digital symbols from the corresponding detection signal. The first detector 60 and the second detector 72 each generate an error signal being essentially the difference between the signals at their input and output. These signals are squared in the squarers 64 and 68 respectively. The output signals of the squarers are subtracted by the subtracter 70. The output signal of the subtracter 70 is integrated over a fixed period of time in the accumulator 78, starting from the moment an erasure is detected. This integration time can be an integer number (e.g. 3–5) of symbol periods.

If both sequences of detected digital symbols are equal, the error signals will be equal, and the output signal of the subtracter 70 will be 0. Consequently the output of the accumulator 78 will be 0. If the sequences of detected symbols are different, the squared error signals will also be different, and the output signal of the accumulator will differ from 0. If the output signal of the accumulator 78 is larger than 0, the total squared error signal from the first detector 60 is larger than the total squared error signal from the second detector 72. Accordingly the control device 80 will generate a control signal for the selector 82 to select the sequence of detected symbols from the output of the shift register 76. If the output signal of the accumulator 78 is smaller than 0, the squared error signal from the first detector 60 is smaller than the squared error signal from the second detector 72. Accordingly the control device 80 will generate a control signal for the selector 82 to select the sequence of detected symbols from the output of the shift register 62.

The reference levels of the first and second detector 60 and 72 are equal to $\alpha$ and $-\alpha$ respectively. Suitable values for $\alpha$ are between approximately 0.2–0.3. To improve the performance of the receiver, it is possible to temporarily make the value of $\alpha$ equal to 0 after a difference between the sequences of detected symbols has been detected. To improve the performance of the receiver even more, it is possible to transfer the state of the feedback filter of the branch delivering the selected sequence of detected symbols to the other feedback filter. This measure eliminates error propagation to a large extent. It is observed that instead of using the square of the error signals, it is also possible to use the absolute value of the error signal.

With respect to implementation complexity, it is more efficient to combine the memory elements in the shift registers 62 and 76 with the memory elements used in the feedback filters 58 and 74. This results into a substantial saving in memory requirements.

We claim:

1. A transmission system comprising:
   a transmitter for transmitting a sequence of digital symbols to a receiver,
   said receiver comprising means for deriving at least a first detection signal and a second detection signal from the received signal,
   at least a first detector for deriving a first sequence of detected symbols from the first detection signals,
   a second detector for deriving a second sequence of detected symbols from the second detection signal,
   means for determining an output sequence of digital symbols from at least the first and second sequence of detected symbols,
   wherein the first detector and the second detector use different reference levels for deriving the first sequence of detected symbols from the first detection signal and the second sequence of detected symbols from the second detection signal and
   wherein when the first and second detectors derive different sequences of detected symbols, the difference is indicative of one of said first and second detectors including unreliable data.

2. The transmission system according to claim 1, wherein the receiver comprises means for temporarily making the reference levels of the first detector and the second detector equal after an instant in which a symbol value in the first sequence of detected symbols differs from a corresponding symbol value in the second sequence of detected symbols.

3. A transmission system comprising:
   a transmitter for transmitting a sequence of digital symbols to a receiver,
   said receiver comprising means for deriving at least a first detection signal and a second detection signal from the received signal,
   at least a first detector for deriving a first sequence of detected symbols from the first detection signal,
   a second detector for deriving a second sequence of detected symbols from the second detection signal,
   means for determining an output sequence of digital symbols from at least the first and second sequence of detected symbols,
   wherein the first detector and the second detector use different reference levels for deriving the first sequence of detected symbols from the first detection signal and the second sequence of detected symbols from the second detection signal,
   the receiver comprises a first feedback filter for deriving a first feedback signal from the first sequence of detected symbols, and a second feedback filter for deriving a second feedback signal from the second sequence of detected symbols, and
   the means for deriving a first detection signal and a second detection signal comprises first combining means for combining a signal representative of the input signal and the first feedback signal into the first detection signal, and second combining means for combining a signal representative of the input signal and the second feedback signal into the second detection signal.

4. The transmission system according to claim 3, wherein the means for determining an output sequence of digital symbols from the at least first and second sequence of detected symbols is arranged for selecting one of the sequences of detected symbols from the at least first and second sequence of detected symbols, and the receiver comprises means for transferring the state of the first feedback filter to the second feedback filter if the first sequence of detected symbols is selected, and the receiver further includes means for transferring the state of the second feedback filter to the first feedback filter if the second sequence of detected symbols is selected.

5. A receiver for receiving a sequence of digital symbols, comprising:

means for deriving at least a first detection signal and a second detection signal from the received signal, at least a first detector for deriving a first sequence of detected symbols from the first detection signal and a second detector for deriving a second sequence of detected symbols from the second detection signal, means for determining an output sequence of digital symbols from at least the first and second sequence of detected symbols, wherein the first detector and the second detector use different reference levels for deriving the first sequence of detected symbols from the first detection signal and the second sequence of detected symbols from the second detection signal and wherein when the first and second detectors derive different sequences of detected symbols, the difference is indicative of one of said first and second detectors including unreliable data.

6. The receiver according to claim 5, wherein the receiver comprises means for temporarily making the reference levels of the first detector and the second detector equal after an instant in which a symbol value in the first sequence of detected symbols differs from a corresponding symbol value in the second sequence of detected symbols.

7. A receiver for receiving a sequence of digital symbols, comprising:

means for deriving at least a first detection signal and a second detection signal from the received signal, at least a first detector for deriving a first sequence of detected symbols from the first detection signal and a second detector for deriving a second sequence of detected symbols from the second detection signal, means for determining an output sequence of digital symbols from at least the first and second sequence of detected symbols, wherein the first detector and the second detector use different reference levels for deriving the first sequence of detected symbols from the first detection signal and the second sequence of detected symbols from the second detection signal, the receiver comprises a first feedback filter for deriving a first feedback signal from the first sequence of detected symbols, and a second feedback filter for deriving a second feedback signal from the second sequence of detected symbols, and the means for deriving a first detection signal and a second detection signal comprises first combining means for combining a signal representative of the input signal and the first feedback signal into the first detection signal, and further comprises second combining means for combining a signal representative of the input signal and the second feedback signal into the second detection signal.

8. The receiver according to claim 7, wherein the means for determining an output sequence of digital symbols from the at least first and second sequence of detected symbols is arranged for selecting the most likely sequence of detected symbols from the at least first and second sequence of detected symbols, and the receiver comprises means for transferring the state of the first feedback filter to the second feedback filter if the first sequence of detected symbols is selected, and the receiver further includes means for transferring the state of the second feedback filter to the first feedback filter if the second sequence of detected symbols is selected.

9. A method for receiving a sequence of digital symbols comprising:

deriving at least a first detection signal and a second detection signal from the received signal, deriving at least a first sequence of detected symbols from the first detection signal and deriving a second sequence of detected symbols from the second detection signal, determining an output sequence of digital symbols from at least the first and second sequence of detected symbols, wherein different reference levels are used for deriving the first sequence of detected symbols from the first detection signal and the second sequence of detected symbols from the second detection signal and wherein when said determining produces different sequences of detected symbols, the difference is indicative of one of said detection signals including unreliable data.

10. The method according to claim 9, further comprising making said reference levels equal after an instant in which a symbol value in the first sequence of detected symbols differs from a corresponding symbol value in the second sequence of detected symbols.

11. The transmission system according to claim 2, wherein:

the receiver comprises a first feedback filter for deriving a first feedback signal from the first sequence of detected symbols, and a second feedback filter for deriving a second feedback signal from the second sequence of detected symbols, and the means for deriving a first detection signal and a second detection signal comprises first combining means for combining a signal representative of the input signal and the first feedback signal into the first detection signal, and further comprises second combining means for combining a signal representative of the input signal and the second feedback signal into the second detection signal.

12. The transmission system according to claim 11, wherein:

the means for determining an output sequence of digital symbols from the at least first and second sequence of detected symbols is arranged for selecting one of the sequences of detected symbols from the at least first and second sequence of detected symbols, and the receiver comprises means for transferring the state of the first feedback filter to the second feedback filter if the first sequence of detected symbols is selected, and the receiver further includes means for transferring the state of the second feedback filter to the first feedback filter if the second sequence of detected symbols is selected.

13. The receiver according to claim 6, wherein:

the receiver comprises a first feedback filter for deriving a first feedback signal from the first sequence of detected symbols, and a second feedback filter for deriving a second feedback signal from the second sequence of detected symbols, and the means for deriving a first detection signal and a second detection signal comprises first combining means for combining a signal representative of the input signal and the first feedback signal into the first detection signal, and further comprises second combining means for combining a signal representative of the input signal and the second feedback signal into the second detection signal.

14. The receiver according to claim 13, wherein: the means for determining an output sequence of digital symbols from the at least first and second sequence of detected symbols is arranged for selecting the most likely sequence of detected symbols from the at least first and second sequence of detected symbols, and the receiver comprises means for transferring the state of the first feedback filter to the second feedback filter if the first sequence of detected symbols is selected, and further comprises means for transferring the state of the second feedback filter to the first feedback filter if the second sequence of detected symbols is selected.

* * * * *